United States Patent
Garcia-Luna-Aceves (10) Patent No.: US 7,142,527 B2
(45) Date of Patent: Nov. 28, 2006

(54) SYSTEM AND METHOD FOR TRANSMISSION SCHEDULING USING NETWORK MEMBERSHIP INFORMATION AND NEIGHBORHOOD INFORMATION

(75) Inventor: Jose J. Garcia-Luna-Aceves, San Mateo, CA (US)

(73) Assignee: Nokia Inc., Irving, TX (US)

( * ) Notice: Subject to any disclaimer, the term of this patent is extended or adjusted under 35 U.S.C. 154(b) by 1030 days.

(21) Appl. No.: 10/087,661

(22) Filed: Feb. 28, 2002

(65) Prior Publication Data

US 2002/0167960 A1    Nov. 14, 2002

Related U.S. Application Data

(60) Provisional application No. 60/272,400, filed on Feb. 28, 2001.

(51) Int. Cl.
*H04J 3/00* (2006.01)
(52) U.S. Cl. .................................. 370/336; 370/348
(58) Field of Classification Search ................ 370/442, 370/447, 336, 448
See application file for complete search history.

(56) References Cited

U.S. PATENT DOCUMENTS

| | | | | |
|---|---|---|---|---|
| 5,517,504 A * | 5/1996 | Tran et al. | ................... | 370/347 |
| 5,953,328 A | 9/1999 | Kim et al. | ................... | 370/337 |
| 5,970,062 A * | 10/1999 | Bauchot | ................... | 370/310.2 |
| 6,141,336 A | 10/2000 | Bauchot et al. | ............. | 370/348 |
| 6,456,599 B1 * | 9/2002 | Elliott | ......................... | 370/254 |
| 6,791,997 B1 * | 9/2004 | Beyer et al. | ................. | 370/447 |
| 2002/0031144 A1 * | 3/2002 | Barton | ........................ | 370/468 |

* cited by examiner

*Primary Examiner*—Chau Nguyen
*Assistant Examiner*—Christopher Grey
(74) *Attorney, Agent, or Firm*—Darby & Darby PC; Thomas R. Marquis (57) ABSTRACT

A system and method is directed at providing collision-free transmission of packets into a channel, such that: an upper bound can be enforced for the time elapsed between two consecutive time slots assigned to the same node; no collision-avoidance handshake is required for each packet transmission, and no pre-assignment of transmission times (slots), channels, or codes are required. Time is divided into frames consisting of a known number of time slots, and frames can be further organized into epochs.

17 Claims, 12 Drawing Sheets

| Dynamic Scheduling | Quasi-Static Scheduling |
|---|---|

SYSTEM AND METHOD FOR TRANSMISSION SCHEDULING USING NETWORK MEMBERSHIP INFORMATION AND NEIGHBORHOOD INFORMATION

RELATED APPLICATION

This application claims the benefit of U.S. Provisional Application No. 60/272,400 filed Feb. 28, 2001, the benefit of the earlier filing date of which is hereby claimed under 35 U.S.C. § 119 (e).

FIELD OF THE INVENTION

The present invention relates to the scheduling of transmissions without collisions in ad hoc networks with radio links in which routers can have both hosts and networks attached to them.

BACKGROUND OF THE INVENTION

Ad-hoc networks (i.e., multihop packet radio networks) is a technology to provide a seamless extension of the Internet to the wireless mobile environment. In ad-hoc networks, nodes (stations or packet radios) can be mobile and may communicate with one another either directly or through intermediate nodes, without relying on any preexisting network infrastructure. The self-configuring, dynamic-connectivity, multihop-propagation and fully-distributed nature of ad-hoc networks makes them very attractive for many new applications but also introduces difficult problems at the link and network layer.

Many medium-access control (MAC) protocols have been developed for wireless networks. The carrier-sense multiple access (CSMA) protocol is one such protocol to be used in multihop packet-radio networks. A limitation of CSMA in multihop networks is that sources hidden from one another cannot detect their transmissions, which degrades CSMA's performance to that of the pure ALOHA protocol.

Many MAC protocols have been proposed and implemented to attempt to solve the hidden-terminal problems of CSMA. The throughput of CSMA protocols is very good, as long as the multiple transmitters within range of the same receivers can sense one another's transmissions. Unfortunately, "hidden terminal" problems degrade the performance of CSMA substantially.

The busy tone multiple access (BTMA) protocol was a proposal to combat the hidden-terminal problems of CSMA. BTMA is designed for station-based networks and divides the channel into a message channel and the busy-tone channel. The limitations of BTMA are the use of a separate channel to convey the state of the data channel, the need for the receiver to transmit the busy tone while detecting carrier in the data channel, and the difficulty of detecting the busy-tone signal in a narrow-band channel.

A receiver initiated busy-tone multiple access protocol for packet-radio networks has also been proposed. In this scheme, the sender transmits a request-to-send (RTS) to the receiver, before sending a data packet. When the receiver obtains a correct RTS, it transmits a busy tone in a separate channel to alert other sources nearby that they should backoff. The correct source is always notified that it can proceed with transmission of the data packet. The limitations of this scheme include that it still requires a separate busy-tone channel and full-duplex operation at the receiver.

Several protocols have been also been proposed based on different types of "collision-avoidance-handshakes done with small control packets and meant to avoid data collisions when sources of data packets cannot hear one another. The collision-avoidance approach follows the basic philosophy of the Split-Channel Reservation Multiple Access (SRMA) protocol. In SRMA, and most subsequent collision-avoidance protocols, a sender node sends a request-to-send (RTS) packet to the intended receiver, either sensing the channel before sending the RTS or not sensing the channel before the RTS transmission. A receiver that hears a clean RTS responds with a clear-to-send (CTS), and the sender can send a data packet after hearing a clean CTS.

However, despite the popularity gained by collision-avoidance protocols and systems based on such protocols over the past few years, two key performance limitations of all collision-avoidance MAC protocols are that: (1) they cannot provide channel-access delay guarantees, which represents a big problem for real-time applications; and (2) they lack explicit support of collision-free multicasting or broadcasting, which implies that either a node must transmit the same multicast packet multiple times, once to each multicast-group neighbor, or packets are sent with likelihood of reception as low as the ALOHA protocol. In addition, collision-avoidance protocols require carrier sensing, which is not technically or economically feasible to implement correctly in direct sequence spread spectrum radios with very high chip rates.

To circumvent hidden-terminal interference problems, unique codes (spreading codes or frequency-hopping sequences) can be assigned to receivers or senders. An example of this approach is the Metricom network. However, receiver oriented code assignment (ROCA) and transmitter oriented code assignment (TOGA) require either pre-configuring radios with the node to code mappings, or finding the codes being used by neighboring transmitters or receivers. Furthermore, efficient broadcasting is not guaranteed simply by establishing a TOCA approach.

Another approach to channel access used in multihop wireless networks consists of establishing transmission schedules, i.e., allocating stations to different times and data channels (e.g., frequencies, spreading codes, or their combination) in a way that no collisions occur. Transmission scheduling can be static or dynamic; MAC protocols based on dynamic transmission scheduling explore the spatial reuse of the radio channel and thus have much higher channel utilization than such fixed scheduling approaches as TDMA and FDMA.

In TDMA protocols, time is divided into frames consisting of time slots. Time slots are allocated to specific nodes or a centralized station is used to allocate the time slots. The limitations of TDMA stem from the fixed assignment of time slots to nodes, which is slow to adapt to network changes and makes inefficient use of the channel if nodes are bursty sources of traffic, and the use of centralized assignments.

There are many approaches in the prior art based on dynamic TDMA methods in which stations use ALOHA, slotted ALOHA or other contention protocols in an uplink to request time slots from a base station. A number of protocols have been proposed in the recent past to provide dynamic time-slot allocation without requiring central base stations. These protocols can be classified as topology-independent and topology-dependent time scheduling protocols.

In these protocols, nodes are pre-assigned (by means of their nodal IDs, for example) or adopt a transmission schedule that they publish, and such a schedule specifies the times when a node transmits and receives. The protocols guarantee or provide a high likelihood that at least one transmission time in a node's schedule does not conflict with any node one or two hops away. Nodes are unable to determine which transmissions will succeed, complicating the job of higher layer (e.g., link-layer) protocols. These approaches also require values for the total number of nodes in the network and maximum number of neighbors for each node, as input parameters to the algorithm, thus making them design for the worst case conditions (and thus, inefficient if the network is not as dense as expected), or being sensitive to actual network conditions (if the network is larger or more dense than expected).

Some protocols require nodes to contend in order to reserve collision-free time slots, and the contention is done on each mini-slot. Furthermore, they rely on dividing each slot into several mini-slots. All this limits the minimum duration that slots may have.

Several approaches have been proposed that are based on TDMA and require an initial, topology-independent schedule, followed by communication among the network nodes to negotiate a final schedule. Because of the need for schedules that are fixed, requiring a few iterations to converge, and of scheduling-frame size equal to the maximum size of the network, these approaches have limited scalability and robustness to mobility or other dynamics. Another approach requires initial assignment of one slot per node, and then negotiation of scheduling packets for assignment of the other slots. However, the initially assigned slot is limited to the first slot in each "frame." Thus, each node's assigned slot occurs every N frames, where N is the maximum network size. The approach, however, does not scale and is slow-adapting to dynamic traffic conditions.

Another protocol, the Robust Environmentally Adaptive Link/MAC (REALM) protocol in combination with the Neighborhood Established Transmission Scheduling (NETS) protocol has been developed. REALM is a MAC protocol that achieves collision avoidance without the need for handshakes between senders and receivers. REALM assumes a synchronous network organized into time frames divided into slots. The amount of synchronization assumed in REALM is the same type of synchronization required in any network operating with frequency hopping radios, such as those designed to operate in ISM bands and commercially available today.

To achieve collision avoidance, a node executing REALM must know the identities of its one-hop and two-hop neighbors and the present time in the network (e.g., the number of the current frame). A limitation of REALM and NETS is that the speed with which schedules are built depends on the random nature of the time elapsed between two consecutive transmissions of NETS schedule packets using REALM as the only mechanism to determine when a node should submit its transmission schedule to its neighbors. There is also the possibility of large deviations over the average number of frames between successful submissions of NETS schedule packets. This can inhibit the ability of a given node to establish the reservations it needs, and it can also impact the synchronization of the network if the synchronization mechanism used in the network relies on the transmission of control packets using REALM.

SUMMARY OF THE INVENTION

The present invention is directed at addressing the above-mentioned shortcomings, disadvantages and problems, and will be understood by reading and studying the following specification.

According to aspects of the present invention, a method and system is directed at providing the collision-free transmission of packets into a channel, such that:

(a) an upper bound can be enforced for the time elapsed between two consecutive time slots assigned to the same node, (b) no collision-avoidance handshake is required for each packet transmission, and (c) no pre-assignment of transmission times (slots), channels, or codes are required.

Time is divided into frames consisting of a known number of time slots, and frames can be further organized into epochs.

According to another aspect of the invention, a fixed set of time slots in a frame are dedicated for quasi-static, deterministic scheduling of such slots to nodes, and an additional set of time slots is assigned to nodes randomly. The objective of the quasi-static method for slot allocation is to enforce an upper bound on the time elapsed between two time slots allocated to the same node. The objective of the dynamic slot allocation method is to share slots very efficiently.

According to yet another aspect of the invention, REALM is used for dynamic slot assignment. A distributed algorithm runs in parallel with REALM for the quasi-static assignment of slots to nodes. The method used for quasi-static assignment of slots to nodes is based on information being maintained at each node in the network. The starting point (slot 1) for the allocation of time slots for quasi-static scheduling is maintained. The list of nodes that have been accepted as part of the network is maintained. The most recent network time is also maintained. The node determines if its list of nodes in the network is current or not based on the most recent network time.

The list of nodes belonging to the network is disseminated among nodes by means of the routing protocol used in the network. The most recent network time is selected using a distributed time synchronization algorithm, such as the one used in REALM. The starting point for the allocation of time slots for quasi-static scheduling can be defined to be the first slot available in an epoch.

Each node assigns a time slot for quasi-static allocation to each of the known node IDs that form part of the network membership that has been distributed by means of routing updates. The rule used for this distributed assignment of node IDs to slot IDs in quasi-static scheduling can be very simple, including the circular ordering of node IDs into consecutive slot IDs. The objective of this rule is to give the existing nodes in the network the largest number of quasi-static allocation slots.

When a node becomes operational, it uses only the dynamic slot allocation method to transmit its packets. The existence of a new node is conveyed to a node as part of either the routing protocol or a neighbor protocol used in the network. The existence of the new node is disseminated to all the nodes in the network by means of the routing protocol.

According to yet another aspect of the invention, nodes admit new nodes for quasi-static scheduling independently of one another, and a new node can start using the time slots reserved for quasi-static scheduling after it receives routing messages from some or all of its neighbors indicating that the node is part of its neighbors' routing tables. In another embodiment of the present invention, all nodes admit a new node into the list of nodes used for quasi-static scheduling at exactly the same time by applying a timeout interval when they first hear abut the existence of the node. The timeout interval starts with the network time when the node first announced its presence and ends after an amount of time that is long enough to ensure that all nodes know about the existence of the new node.

To use the time slots allocated for quasi-static scheduling, a node simply orders the IDs of the nodes known to belong to the known network membership list and maps them in an ordered manner to the time slots reserved for quasi-static scheduling. In steady state, all nodes that have been admitted into the assign the same time slot to the same node ID, because all of them have the same list of admitted network nodes and all nodes used the same starting point (i.e., slot 1) for the allocation of nodes to sots in quasi-static scheduling.

According to still yet another aspect of the present invention, to achieve more efficient channel utilization for quasi-static scheduling when multiple Internet access points (air heads) are present in the system, each node can associate the list of nodes accepted into the network to the ID of the air head used by the node to access the Internet.

According to a further aspect of the invention, the time slots allocated for quasi-static scheduling can be used to transmit short control packets, while the time slots allocated for dynamic scheduling can be used to transmit long control packets. This may be desirable in order to increase channel utilization.

According to yet another aspect of the invention, a base station is not needed to make slot assignments. Additionally, slots do not need to be subdivided, and nodes do not need to reply to neighbors in less than a frame time.

DETAILED DESCRIPTION

In the following detailed description of exemplary embodiments of the invention, reference is made to the accompanied drawings, which form a part hereof, and which is shown by way of illustration, specific exemplary embodiments of which the invention may be practiced. Referring to the drawings, like numbers indicate like parts throughout the views. Additionally, a reference to the singular includes a reference to the plural unless otherwise stated or is inconsistent with the disclosure herein.

A system and method for the scheduling of transmissions in ad hoc networks will now be described.

I. Basic Service and Assumptions

For purposes of this discussion, the radios used in the exemplary network are half-duplex and tune to only one channel at a time, although they can switch to any of the available channels. Like previous MAC protocols based on transmission scheduling, time is slotted and that slots are grouped into frames. Frames are further organized into epochs.

Multiple orthogonal data channels may be available for data transmission. These channels can be implemented by means of multiple frequency bands, direct-sequence or frequency-hopped spreading codes, or combinations of waveforms that combine such techniques. The present invention focuses on the allocation of time slots for broadcast transmissions over a common channel, so that nodes can transmit control packets used for establishing transmission schedules over multiple data channels, or data packets.

Bi-directional physical links among neighboring nodes is also assumed. According to an embodiment of the invention, each neighbor of a node is identified by the node using a transmitter-assigned local link identifier, which is denoted by "XLID". In another embodiment of this invention, nodes can be identified by their MAC addresses. In the description of the present invention presented herein, the term "node identifier" denotes either XLIDs or MAC addresses of nodes.

According to an embodiment of the present invention, time slots are identified using a unique identifier specifying the position of the time slot in a frame and the position of a frame in an epoch. An epoch can be identified using the current time agreed upon among nodes by means of a time synchronization algorithm. In the description of the present invention, the term "slot ID" denotes the identifier of a time slot based on the "network age" of the network. Each epoch has a fixed number of frames and each frame has a fixed number of time slots.

Each node can have up to a predetermined number of active one-hop neighbors. Each active one-hop neighbor is assigned a node identifier; and it is assumed that a node assigns consecutive node identifiers to active neighbors. The assignment of a node identifier to a neighbor is accomplished by means of a method that is outside the scope of the present invention.

The nodes executing the method described in the present invention are called "Internet Radios (IR)". The terms "node" and "Internet Radio" are used interchangeably in the description of the invention. A routing protocol exists in the network, such that each IR is able to maintain routing information to every other IR in the network. The number of time slots available in an epoch for quasi-static scheduling is larger than the number of IRs in the network.

The basic service that is directed to be provided by the present invention consists of reserving time slots to IRs for collision-free broadcast transmissions over a common broadcast channel in such a way that an upper bound is ensured for the time elapsed between two time slots assigned to a given IR in the system.

II. Information Exchanged and Maintained

Figure 1:
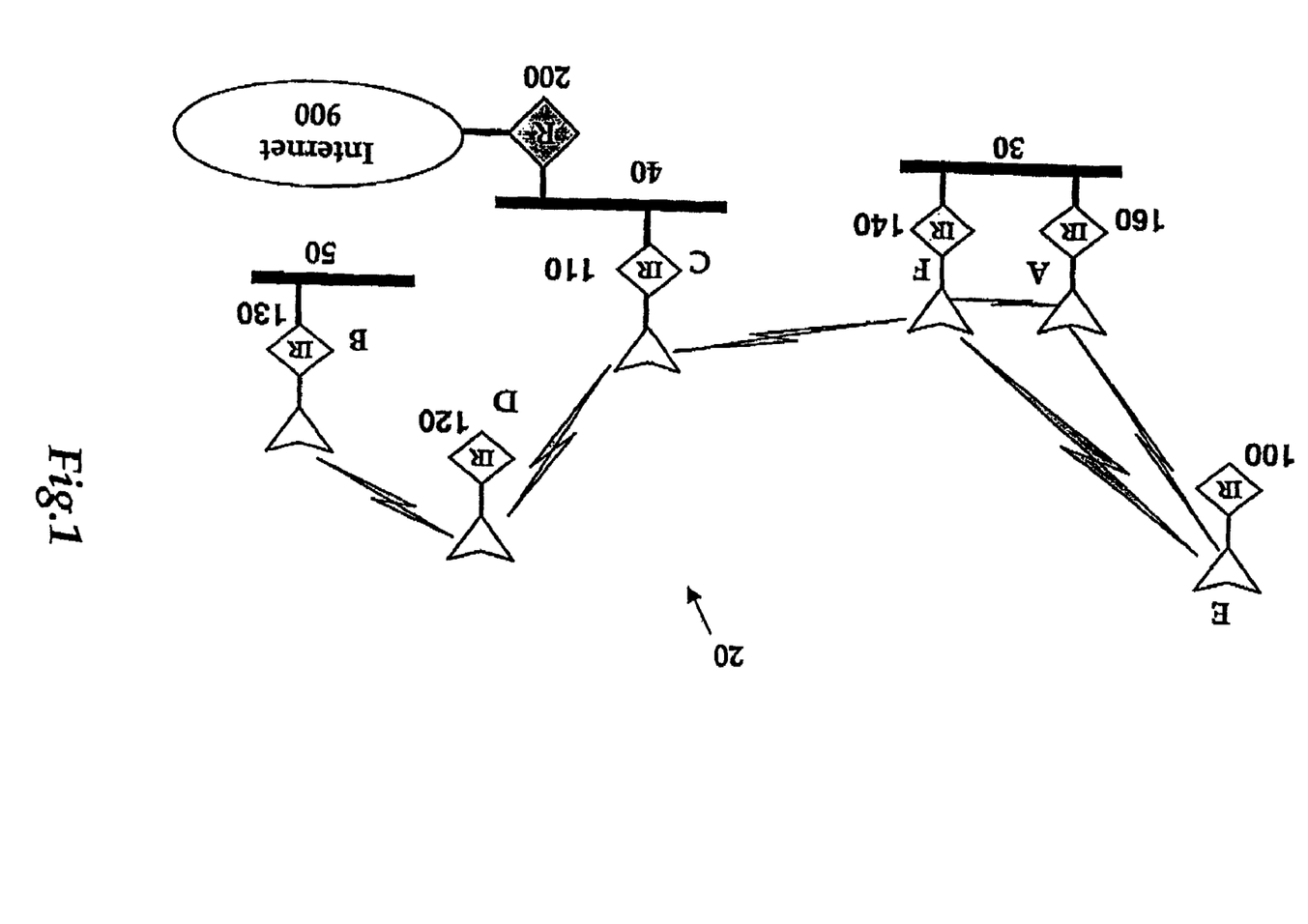
FIG. 1 illustrates an Ad hoc network before IR G becomes operational.

FIG. 1 illustrates an exemplary Ad hoc network before IR G becomes operational. The ad hoc network consists of a number of subnetworks 20, 30, 40, 50, which provide an extension of the Internet through a number of IRs (100, 110, 120, 130, and 140). Each IR, 100–140, is a wireless router with an IP address and a MAC address. Ad hoc network 20 attaches to the Internet 900 via an access point, called "AirHead.1" The AirHead in FIG. 1 is IR 110, which is interconnected to an Internet router 200 through local area network 40.

After a finite amount of time, the five IRs (100–140) in the ad hoc network 20 of FIG. 1 have the same list of IRs that are present in the network.

The IRs in the network are synchronized and agree on the periods within which packets (e.g., control packets) will be scheduled. These periods are called "Frames." Each Frame is associated with a "Network Age," (NetAge) which changes from frame to frame, and is known throughout the network. For example, the network may be synchronized by epochs, frames, and slots, with a constant integer number (S) of slots per frame, and a constant integer number (F) of frames per epoch. Within each epoch, frames are numbered consecutively from 1 to F (the "Frame Number"). Epochs are also numbered consecutively, eventually wrapping back to Epoch Number 1 after E epochs. The above Network Age can either be the Frame Number concatenated with the Epoch Number, or simply just the Frame Number if the number of frames in an epoch is sufficiently large.

Each IR learns the unique node IDs of the IRs one and two hops away from it, which constitute its 2-hop neighborhood. An IR learns about the presence of its direct (1-hop) neighbors by means of a neighbor discovery and management protocol, possibly in combination with control packets. Two-hop neighbors and nodes beyond two hops from the node are learned by means of control packets.

According to one embodiment of the invention, the Robust Environmentally Aware Link and MAC) REALM protocol is used for the assignment of transmission slots dynamically. Other protocols may be used.

Using REALM, IRs determine the present network time, which identifies the present time slot in the current frame of the current epoch. The starting point (slot 1) for the allocation of time slots for quasi-static scheduling is simply defined to be the first time slot of an epoch. Hence, because REALM uses a constant number of frames per epoch, and enables an IR to know on which frame and on which slot the IR is at the present time.

According to one embodiment of the invention, the AIR (Adaptive Internet Routing) protocol is used for the distribution of routing information. Other protocols may be used.

Because in AIR each node conveys to its neighbors its shortest-path routing tree, and because such a tree specifies every network node, the update messages used in AIR can be used to convey the list of nodes that have been admitted into the network.

Figure 7:
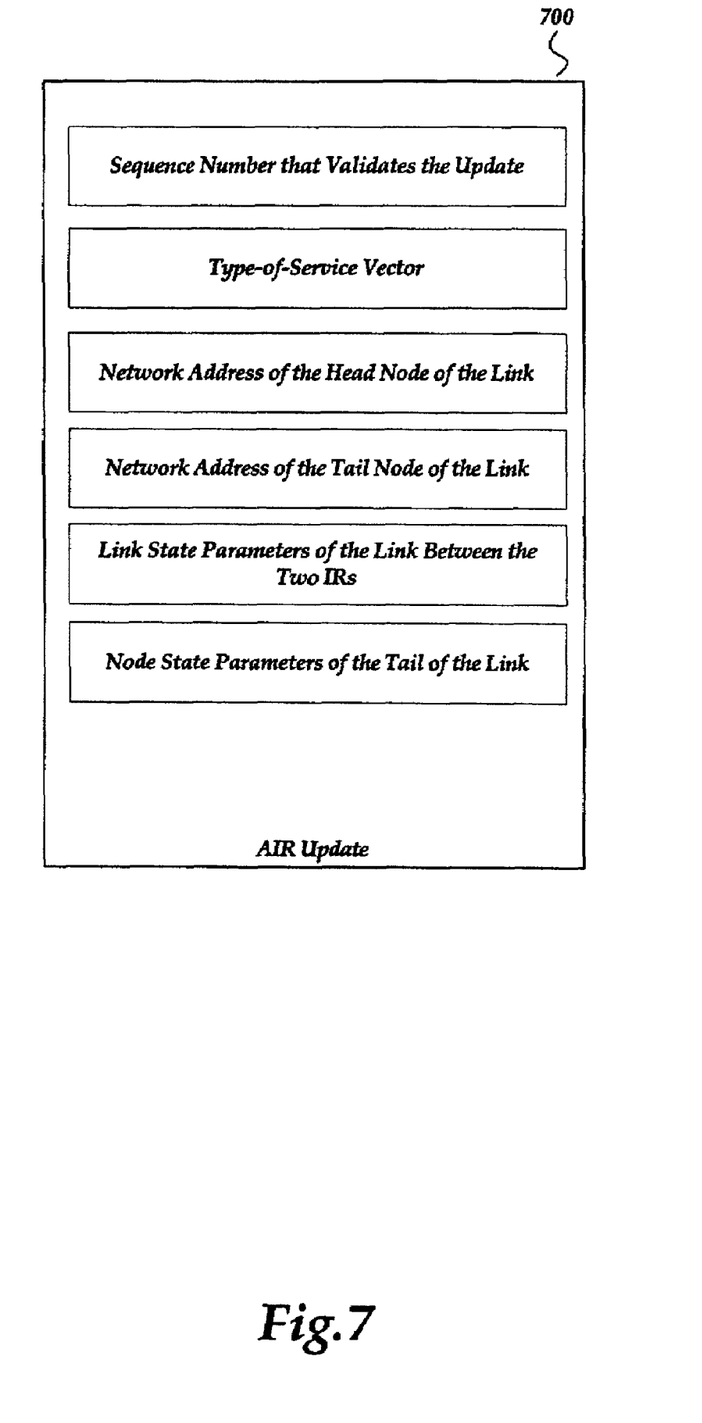
FIG. 7 illustrates an update according to the AIR protocol.

Routing protocols in the prior art based on topology information or distance information are based on the parameters of links exclusively. In contrast, AIR uses an update unit that conveys information about the performance characteristics and addressing information for a link and the node at the end of the link. FIG. 7 illustrates an update according to the AIR protocol. More specifically, update 700 in AIR consists of the following elements:

a) A sequence number that validates the update;
b) A type-of-service vector;
c) The network address of the head node of the link;
d) The network address of the tail node of the link;
e) The link state parameters of the link between the two IRs; and
f) The node state parameters of the tail of the link.

An update message sent by an IR contains at least one update. The sequence number of the update is assigned by the head of the link and cannot be altered by any other node relaying the update in an update message. The type-of-service (TOS) vector is a bit vector specifying the TOS routing tree in which the link is being used by the node sending the update. The state parameters of a link are specified as a list of tuples, with each tuple consisting of a type and a content. There are two classes of state parameters for a link: performance parameters and addressing parameters. The performance of a link can be characterized in terms of its delay, cost, bandwidth, and reliability, for example. An addressing parameter specifies an identifier assigned to the link. An important identifier in the present invention is the local link identifier (LLID) assigned to the link by the head of the link. The state parameters of the tail of a link include, for example, the remaining battery life of the node.

Each IR communicates to its neighbors its source tree, which consists of all the links in the preferred shortest paths to all destinations. Accordingly, a node receives the ID of each IR known to a neighbor as part of the routing updates sent in AIR.

Figure 8:
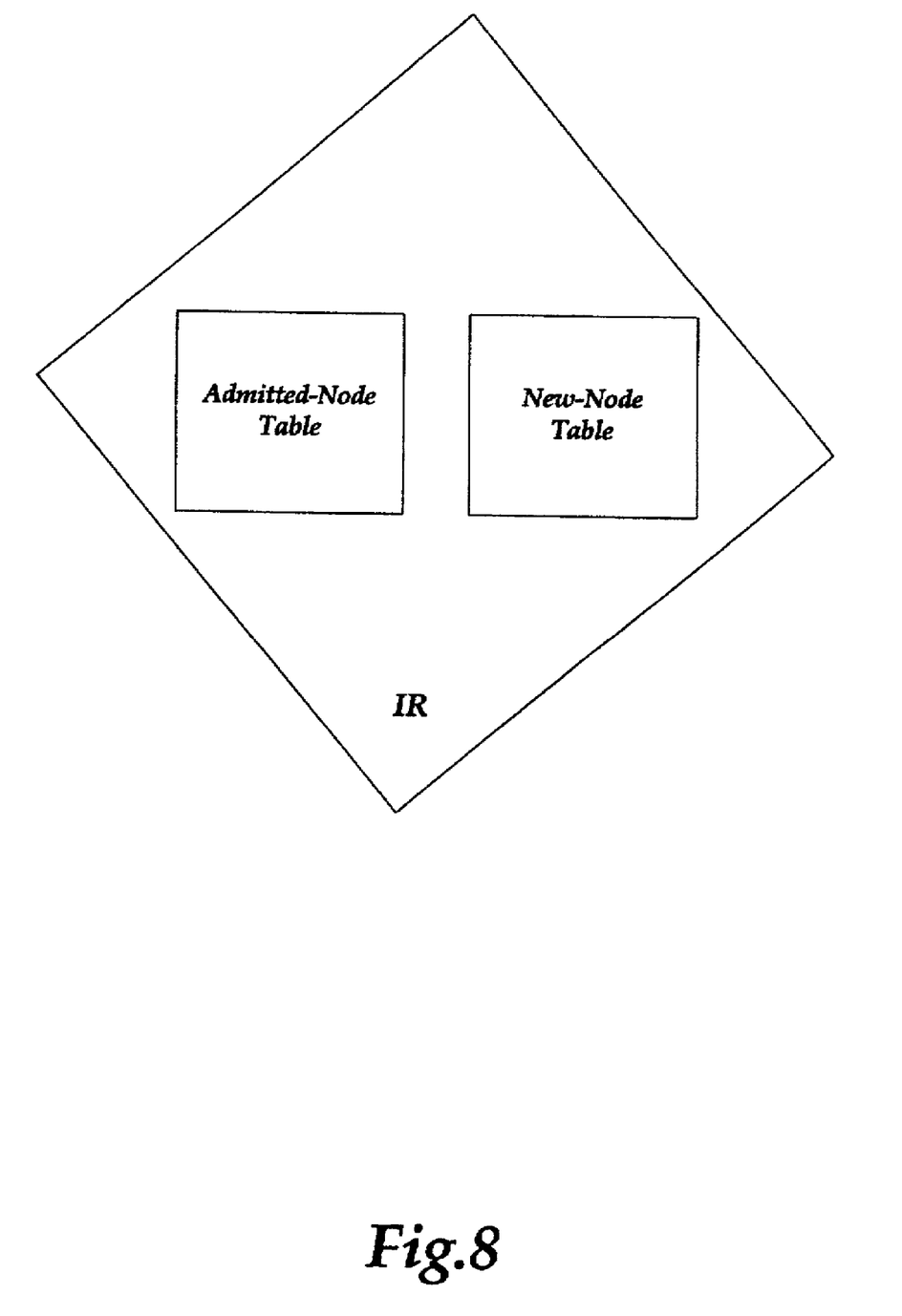
FIG. 8 illustrates an IR maintaining an admitted-node table and a new-node table.

FIG. 8 illustrates an IR maintaining an admitted-node table and a new-node table. Each IR maintains an admitted-node table, which table specifies all the IRs in the network that have been admitted for inclusion in the assignment of time slots reserved for quasi-static scheduling. An IR maps IR identifiers to time slots allocated for quasi-static scheduling only from the admitted-node table.

In an embodiment of the present invention, IRs add new IRs to the admitted-node table at different times, depending on when the IRs learn about the existence of the new IRs. According to another embodiment of the present invention, all the IRs in the network synchronize the time when they all add any new IR into the admitted-node table. To accomplish this synchronization, each IR maintains an additional table called the new-node table. The new-node table specifies, for each known new IR in the network, the unique identifier of the IR and the network time when the IR is assumed to have first announced its entry, or re-entry in case of a failure, into the network. An IR uses its admitted-node table to allocate time slots reserved for quasi-static scheduling to IRs. An entry in the new-node table is kept for a hold-down time interval after it is added to the table, and is copied into the admitted-node table after the hold-down time interval elapses and the IR is still part of the topology table maintained by means of the AIR protocol. Furthermore, to accomplish schedule synchronization, AIR control packets are extended to convey the network time when a new IR joins the network. A new IR notifies its neighbors about the network time when-it becomes operational simply by including that time as a node-state parameter of the head of the link to each of its neighbors. IRs other than the new IR entering the network convey the network time when the new IR joins as a node-state parameter of the tail of the link used in their source trees to reach the new IR.

III. Transmission Scheduling

Figure 9:
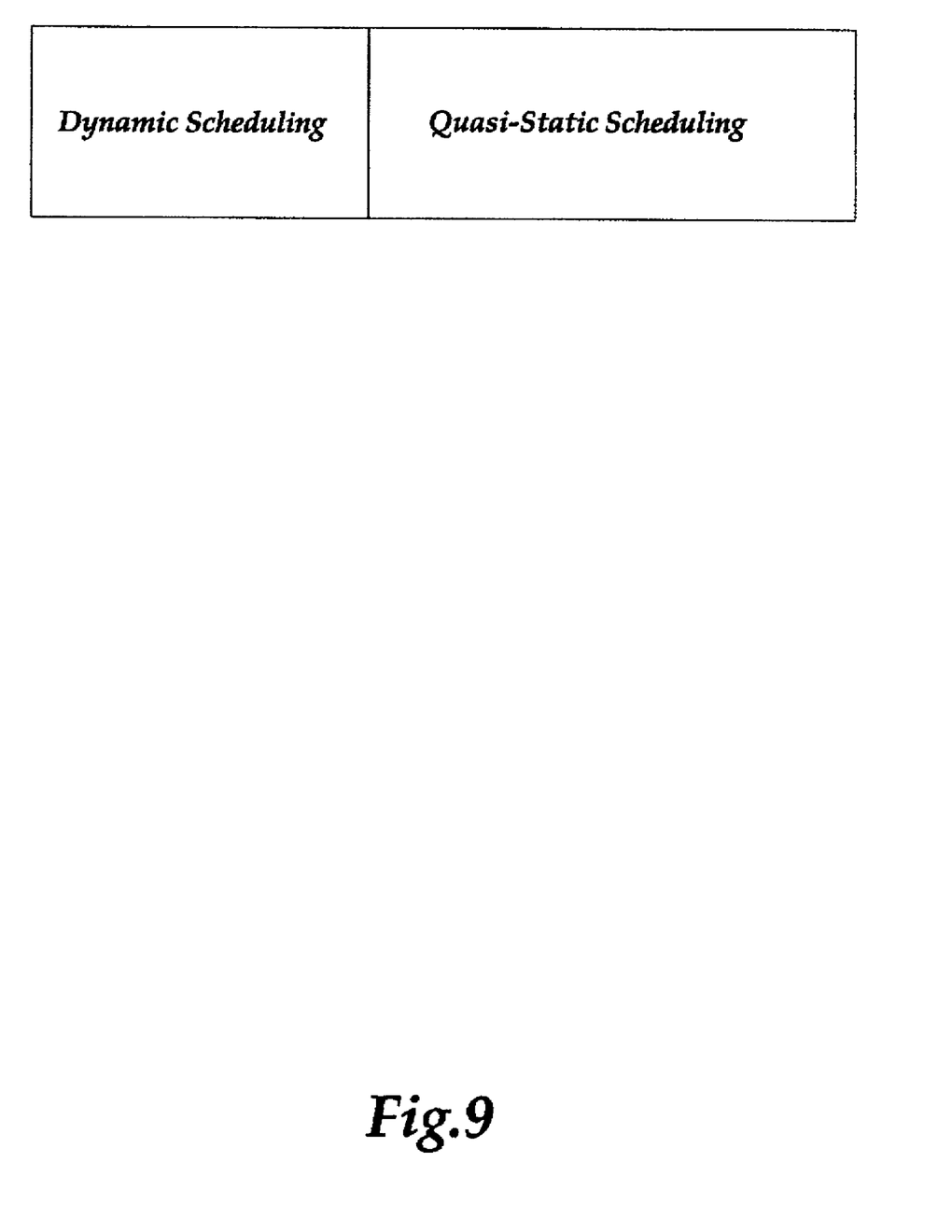
FIG. 9 shows a frame with a fixed number of time slots for dynamic scheduling and a fixed number of time slots for quasi-static scheduling.

FIG. 9 shows a frame with a fixed number of time slots for dynamic scheduling and a fixed number of time slots for quasi-static scheduling. According to one embodiment of the present invention, each frame has a fixed number of time slots for dynamic scheduling and a fixed number of time slots for quasi-static scheduling. A node uses two different methods to determine when to transmit over time slots dedicated for dynamic scheduling and time slots dedicated for quasi-static scheduling.

For quasi-static scheduling, time slots are assigned to nodes using a deterministic algorithm based on the identifiers of all the nodes in the network, and ensures an upper bound for the time elapsed between two time slots allocated to the same node using the quasi-static scheduling method. For dynamic scheduling, time slots are assigned at random among nodes. The quasi-static slot assignment method uses a separate set of time slots than the dynamic slot assignment method, so that upper bounds for times elapsed between the occurrences of time slots allocated to the same nodes can be provided.

The method for dynamic slot allocation in REALM is based on information regarding the two-hop neighborhood of a node. The rest of this description focuses on the quasi-static scheduling of transmission slots to nodes based on network-wide information.

When an IR becomes operational, it uses the dynamic slot allocation method to transmit its packets.

Figure 10:
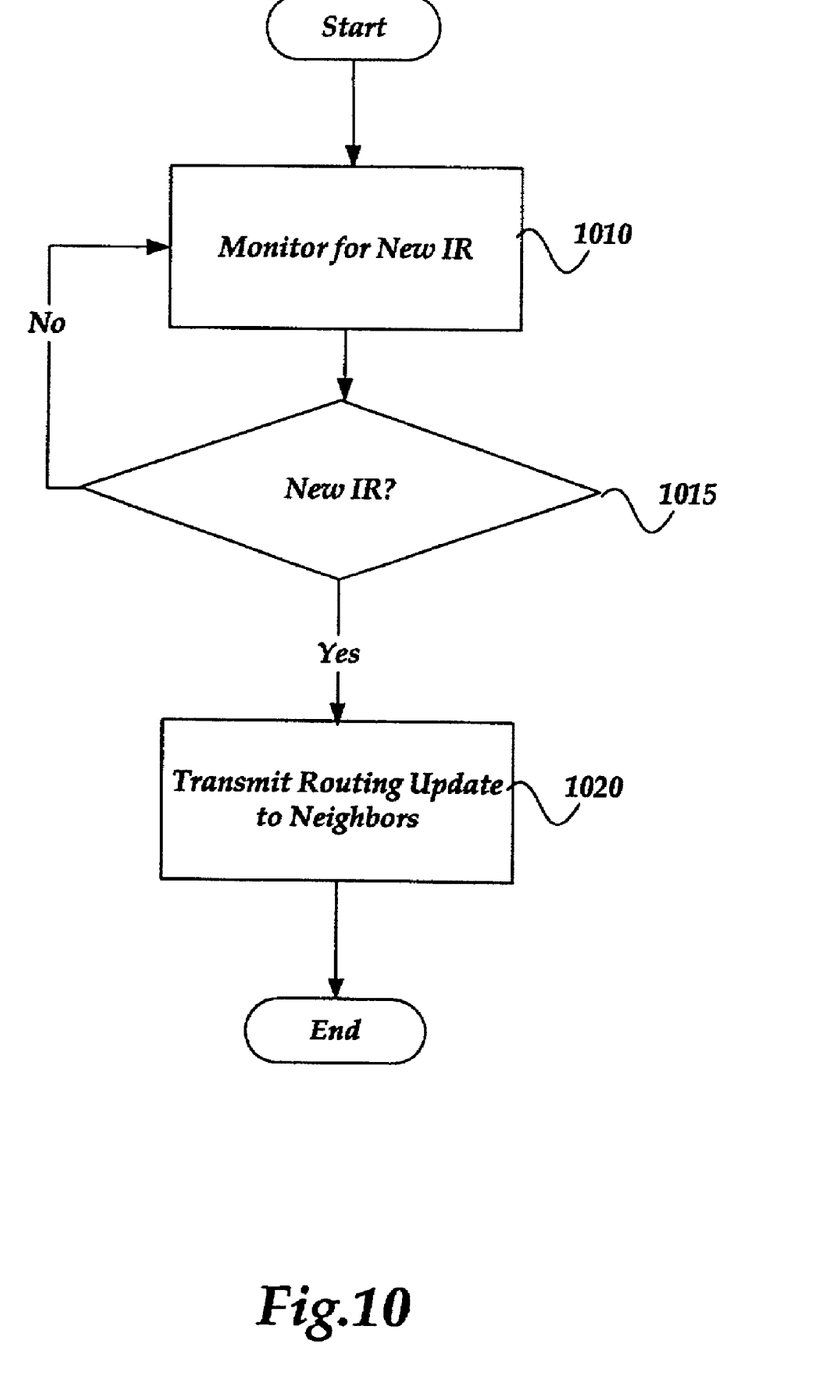
FIG. 10 illustrates a process when an IR learns about the existence of a new IR.

FIG. 10 illustrates a process when an IR learns about the existence of a new IR. After a start block, the process flows to block 1010 where an IR monitors for a new IR. Moving to decision block 105, a determination is made as to whether there is a new IR. When an IR learns about the existence of a new IR, the process transitions to block 1020, where the IR transmits a routing update to all its neighbors as part of the routing protocol used in the network. This action ensures that the existence of any IR is propagated throughout the network to all IRs within a finite time. Accordingly, all IRs reach the same notion of which IRs belong to the network within a finite time after the instant of the last IR join in the network. When there is not a new IR, the process returns to block 1010 to continue monitoring.

If the ratio of the number of time slots available for quasi-static assignment over the number of nodes accepted into the network is an integer number X plus a fraction, each IR is assigned X consecutive time slots and a number of time slots allocated for quasi-static scheduling at the end of an epoch remain unused or are accessed randomly by IRs that have not been admitted into the network. In another embodiment of the present invention, for a given integer value Y smaller than X, each IR can be assigned [X/Y] consecutive slots, where [a] represents the largest integer smaller than or equal to a, and the same quasi-static schedule is repeated Y times in an epoch.

In yet another embodiment of the present invention, IRs may be assigned different priorities (e.g., on the basis of the traffic they need to carry to and from the Internet), with priority 1 being the smallest priority. In this case, an IR of priority p is allocated p times more time slots than an IR of priority 1.

Figure 2:
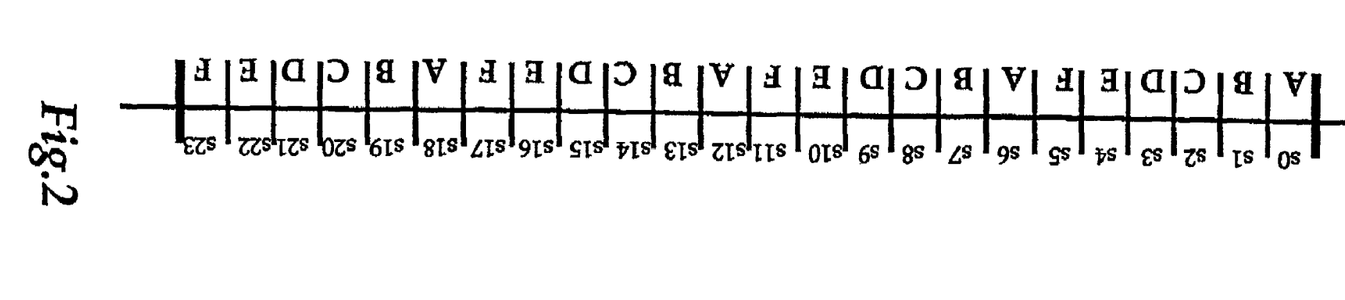
FIG. 2 shows a quasi-static schedule used at all IRs before IR G becomes operational.

FIG. 2 shows the quasi-static portion of the transmission schedule assumed by all IRs 100 to 140 of FIG. 1 at that time.

To use the time slots allocated for quasi-static scheduling, an IR can simply order the IDs of the known IRs in the network in ascending or descending order, and assign the first time slot for quasi-static scheduling to the first IR in the list, the second time slot for quasi-static scheduling to the second IR in the list and so forth, until all the IRs in the list have been assigned time slots. In an embodiment of the present invention, the number of time slots available in an epoch for quasi-static scheduling is divided by the number of IRs known in the network, and each IR is assigned the same resulting ratio of time slots.

In the example illustrated in FIG. 2, it is assumed that 24 time slots in an epoch are allocated to the quasi-static portion of the transmission schedule and are shown adjacent to each other for simplicity. The example further assumes that time slots of the quasi-static schedule are assigned to IRs known in the network simply based on the identifiers of the IRs in ascending order (A to F) and repeating complete sequences of IR IDS as many times as needed.

In steady state, all nodes that have been admitted into the network assign the same time slot to the same node ID, because all of them have the same list of admitted network nodes and all IRs use the same starting point (i.e., slot 1) for the allocation of nodes to sots in quasi-static scheduling.

In contrast to the prior art in which time slots are either pre-assigned to nodes or explicit handshakes are used among node to obtain such allocations, IRs in the present invention use a distributed election algorithm to assign slots for quasi-static scheduling to IRs, using the network membership data they obtain from the routing protocol used in the network.

III. A. Asynchronous Scheduling

According to one embodiment of the present invention, IRs are allowed to start including a new IR for the allocation of slots for quasi-static scheduling without having to ensure that all other IRs in the network start including the new IR at exactly the same time. This approach is referred to as "asynchronous scheduling."

Figure 3:
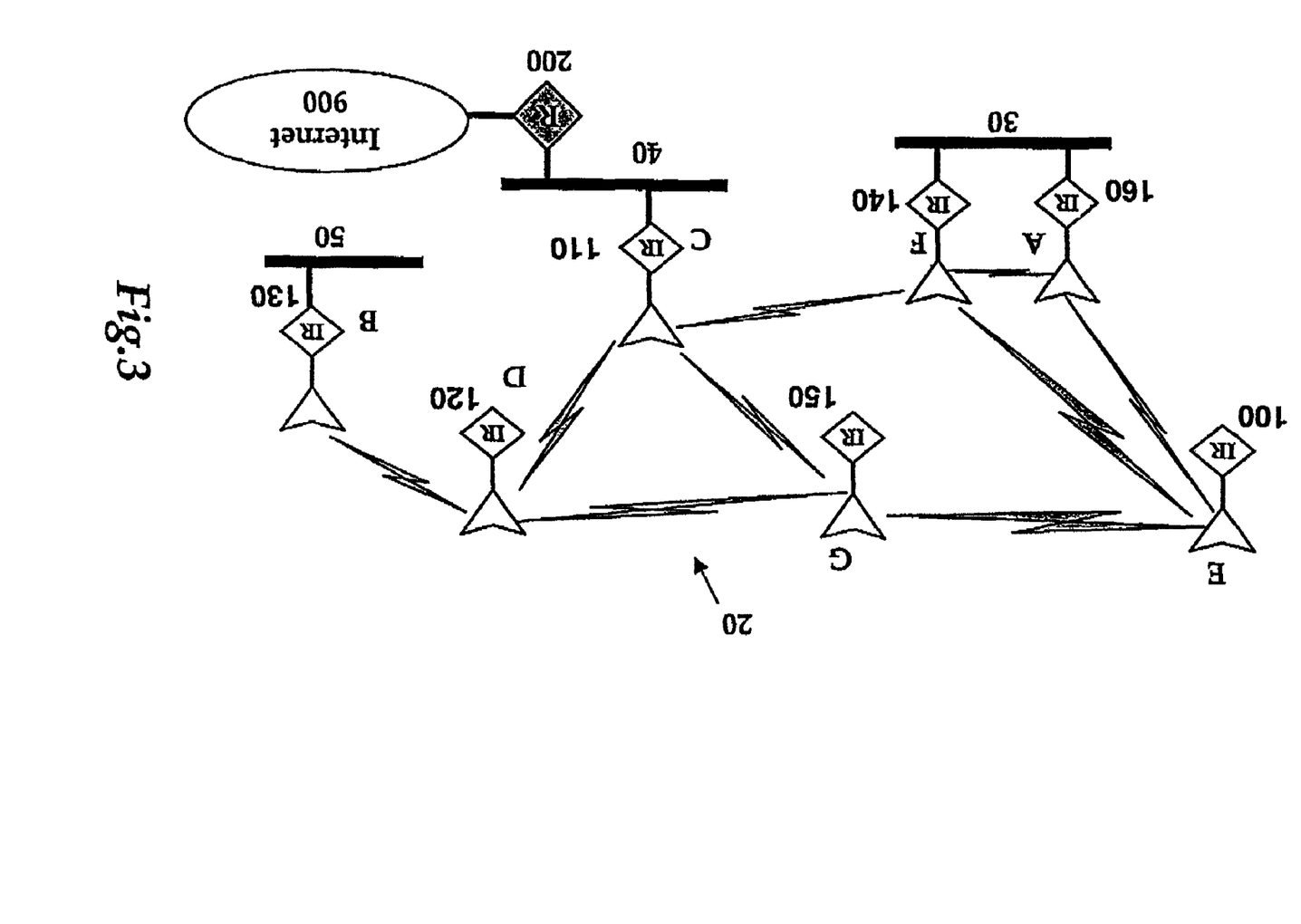
FIG. 3 illustrates an Ad hoc network after IR G becomes operational.

FIG. 3 shows the same ad hoc network of FIG. 1 after IR 150 is added to the network. In one embodiment of the present invention, once a new IR is included, other IRs can start using the time slots reserved for quasi-static scheduling immediately after receiving routing messages or other types of control packets from its neighbors informing the IR that it is known to be present by a majority of its known neighbors.

In another embodiment of the present invention, the new IR may start using the time slots allocated for quasi-static scheduling after receiving the first update from a neighbor indicating that it knows about the existence of the new IR, or after all the neighbors of the new IR indicate through update messages or otherwise that the new IR is present.

Figure 4:
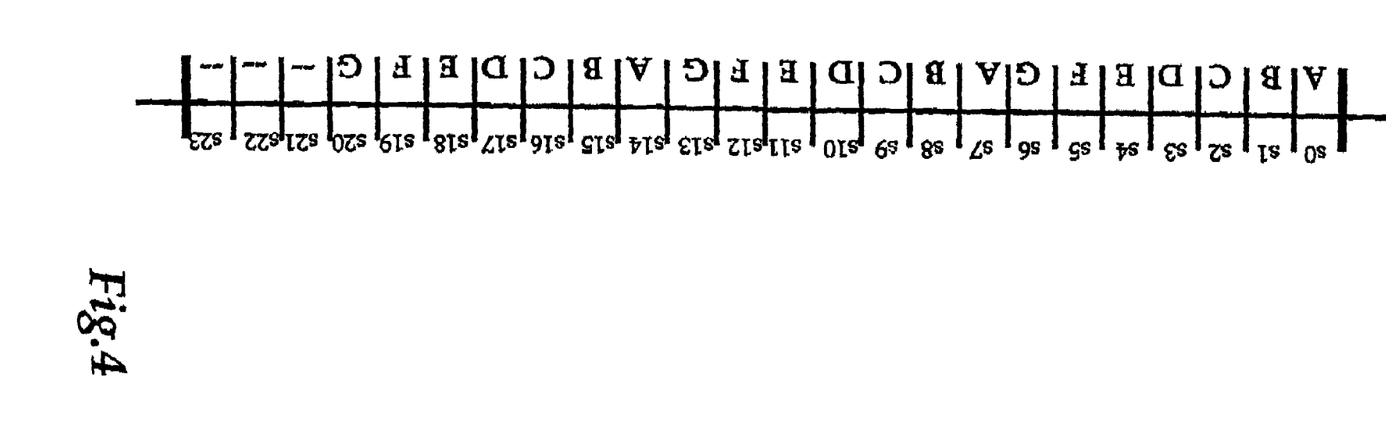
FIG. 4 shows a quasi-static schedule used IRs C, D, E, and F immediately after receiving routing update from IR G.

Assuming that an IR adds an IR to the quasi-static transmission schedule immediately after learning about its existence through the routing protocol (AIR), FIG. 4 shows the quasi-static transmission schedule assumed by the neighbors of IR 150 immediately after receiving an update message from it. Immediately IRs 100, 110, 120, and 140 learn about the presence of IR 150, the transmission schedule they assume differs substantially from the schedule assumed by the rest of the IRs in the system other than IR 150. IR 150 assumes the same schedule as IRs 100, 110, 120, and 140, because IR 150 has exactly the same list of IRs as its neighbor IRs do. In contrast, IRs 130 and 160 will have a list of IRs in the network that does not include IR 150 until they receive a routing update message from neighbor IRs that already know about the presence of IR 150 in the network.

The inconsistencies in transmission schedules assumed by different IRs can cause some IRs to be unable to receive correctly a packet transmitted by a neighbor IR, because more than one of its neighbor IRs transmits in the same time slot, resulting in a collision at the receiving IR. A collision can occur when an IR is the neighbor of IRs that have inconsistent transmission schedules, such that those neighbors assign to themselves the same time slot in the schedule.

An advantage of asynchronous scheduling is that it is very simple to implement. Asynchronous scheduling is easy to implement because it requires no modifications to the routing protocol used in the network. A disadvantage of this approach, however, is that different IRs may have different lists of IRs to be used for the allocation of time slots to IRs for quasi-static scheduling, which can lead to collisions of packets before all IRs have consistent information regarding the IRs that need to be assigned time slots.

Figure 5:
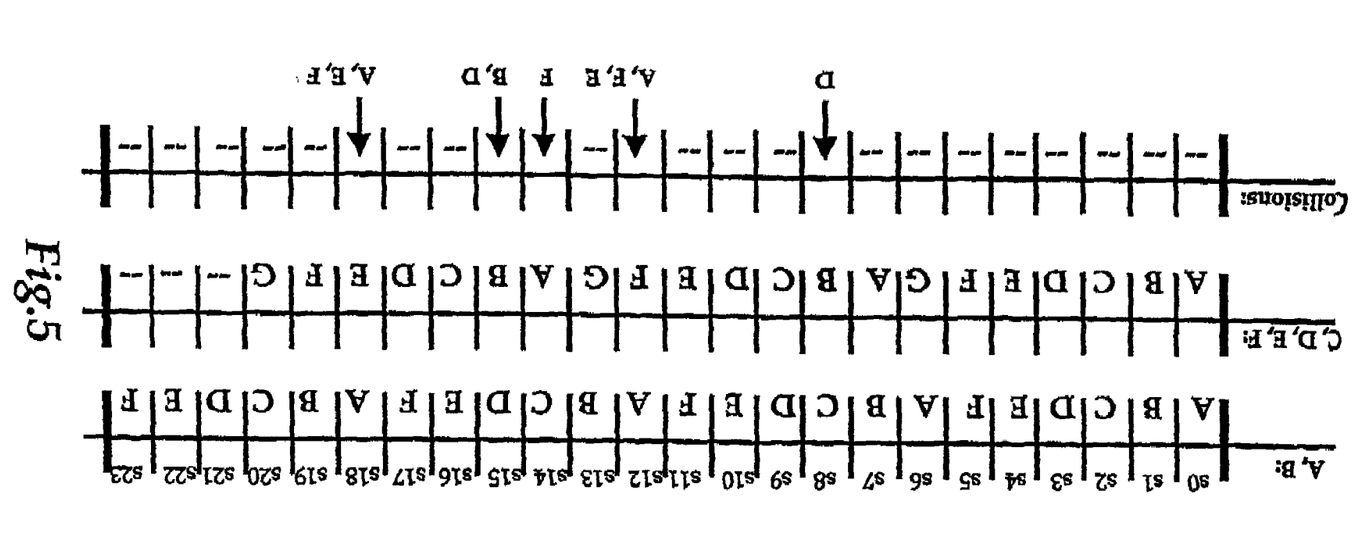
FIG. 5 illustrates possible collisions at IRs due to inconsistent schedules.

FIG. 5 shows the possible collisions for the same example ad hoc network of FIG. 3. The FIGURE shows the schedules assumed by all IRs other than IR immediately after IRs 100, 110, 120, and 140 learn about the existence of IR 150, followed by the description of the possible collisions due to the inconsistencies in the two schedules. In this example, IR 150 cannot cause any collisions, because it obtains a list of IRs in the network at the same time than all other IRs in the network have a consistent list of IRs. When a collision can occur in a time slot, FIG. 5 indicates all the receiver IRs that experience the collision due to the transmissions by IRs allocated to the same time slot. For example, during time slot 12, IRs 100, 140 and 160 will be unable to receive the transmission from IR 100 or 140 or both if both IRs transmit during the time slot. Similarly, during time slot 8, IR 120 will be unable to receive the transmissions from both IR 110 and 130.

The occurrence of collisions due to inconsistent quasi-static schedules persists only up to the time when all the IRs in the network have the same list of IRs that should be used for quasi-static scheduling. The amount of time during which this can be the case is proportional to the maximum length in hops from any IR to any other IR in the network, times the time it takes to transmit a routing update message across a given hop.

III. B. Synchronous Scheduling

To reduce the possibility of packets colliding during time slots allocated for quasi-static scheduling, IRs can be synchronized with one another at the time when all of them should add a new IR to the admitted-node table. This synchronization is used when an IR is brought into operation and when two network components merge with each other when two or more IR establishes radio connectivity with one another.

Figure 11:
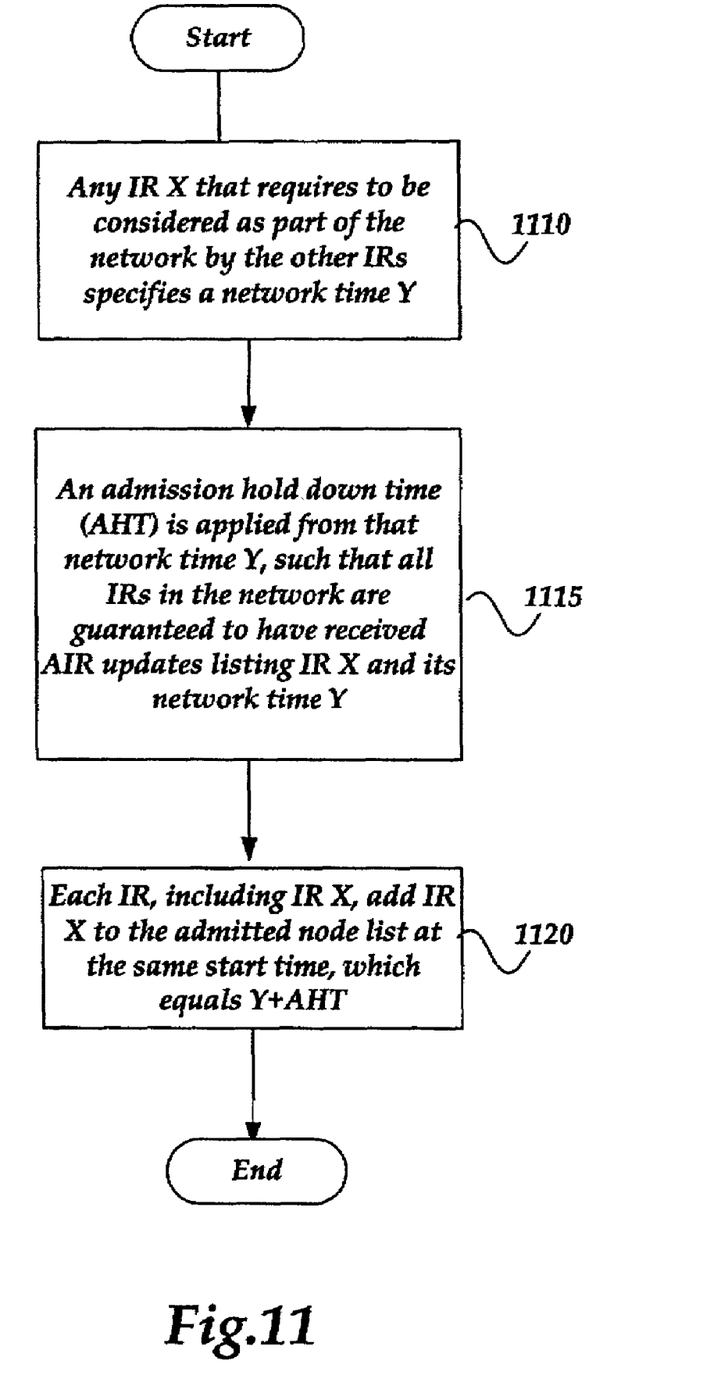
FIG. 11 illustrates a method for admitting an IR into the admitted-node table.

FIG. 11 illustrates a method for admitting an IR into the admitted-node table. An IR allocates time slots for quasi-static scheduling only to those IRs listed in its admitted-node table. All IRs admit any new IR into the admitted node table at exactly the same time using the following method:

(a) Any IR X that requires to be considered as part of the network by the other IRs specifies a network time Y (block 1110).

(b) An admission hold-down time (AHT) is applied from that network time Y, such that all IRs in the network are guaranteed to have received AIR updates listing IR X and its network time Y (block 1115).

(c) Each IR, including IR X, add IR X to the admitted-node list at the same start time, which equals Y+AHT (block 1120).

The duration of the AHT is engineered for each network to be long enough for all the IRs of the network to learn about the existence of the new IR. By design, all the IRs of a network obtain consistent up-to-date routing information with the AIR protocol within an amount of time shorter than an epoch.

The length of the AHT is also such that, regardless of the network time when a new IR became operational, all the IRs in the network start including the new IR for the allocation of time slots reserved for quasi-static scheduling at the same schedule starting point (slot 1). This is accomplished by including some padding time in the AHT, which consists of the time period from the network time when the new IR becomes functional to the start of the next epoch.

Figure 6:
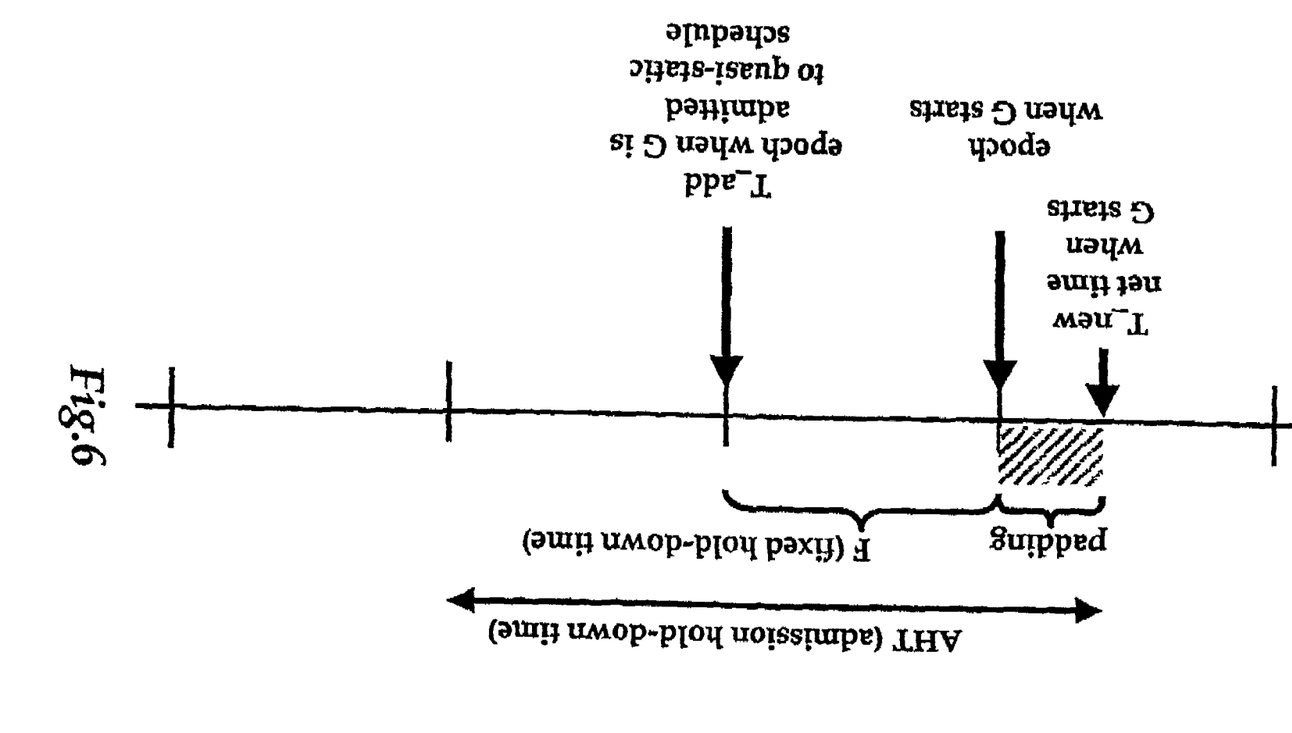
FIG. 6 shows computation of admission hold-down time for a new IR at each IR in the network.

FIG. 6 illustrates an example of the computation of the admission hold-down time. Because all IRs obtain consistent routing information within one epoch, an AHT equal to the padding plus one epoch is long enough for all IRs to admit the new IR at exactly the same network time T_add.

When the AHT of an entry in the new-node table expires, the identifier of the corresponding IR is copied into the admitted-node table, so that the IR can be included in the allocation of time slots reserved for quasi-static scheduling.

When a new IR comes up, it sends an AIR update message containing an update specifying the network time when the IR comes up as a node-state parameter of the head of the link to each or at least one of the links to its neighbors. After the new IR sends its update message, it starts an AHT for itself, which means that the new IR cannot add itself to the admitted-node table until the hold-down time expires.

Having AIR update messages in the network stating different network times when the IR became operational disrupts the updating of the transmission schedule. To avoid this problem, a new IR that is brought up applies a time out of at least one epoch, before it can notify to its neighbors that it is up. This time out is long enough to ensure that there are no old AIR update messages being exchanged in the network stating a network time for a prior instance of the IR coming up.

Figure 12:
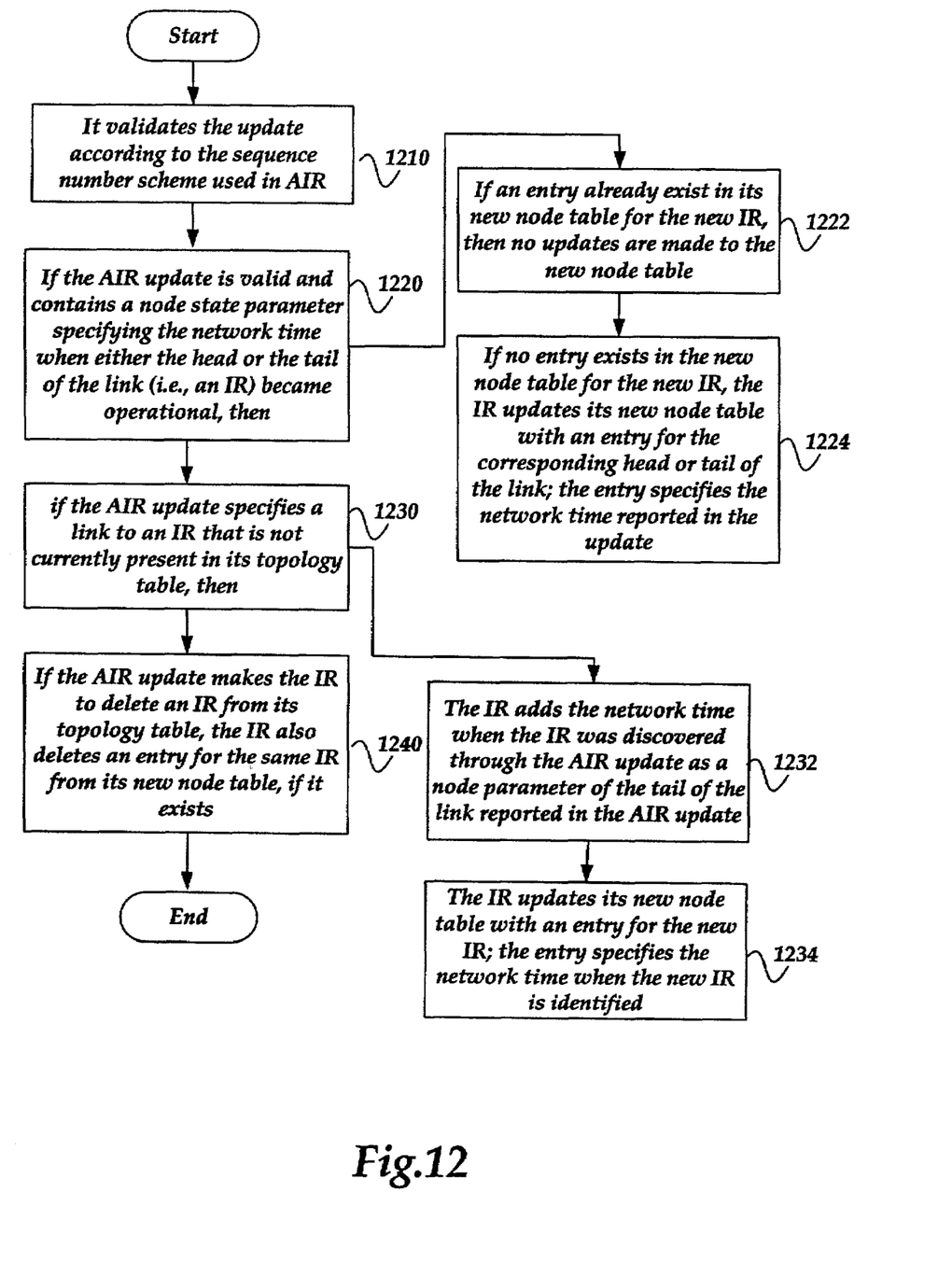
FIG. 12 shows a process for when an IR receives an AIR update; in accordance with aspects of the invention.

FIG. 12 shows a process for when an IR receives an AIR update. When an IR receives an AIR update it carries out the following steps in addition to the steps carried out in AIR to forward updates and update routing information:

a) It validates the update according to the sequence-number scheme used in AIR (block 1210).

b) If the AIR update is valid and contains a node-state parameter specifying the network time when either the head or the tail of the link (i.e., an IR) became operational, (block 1220) then:

i) If an entry already exist in its new-node table for the new IR, then no updates are made to the new-node table (block 1222).

ii) If no entry exists in the new-node table for the new IR, the IR updates its new-node table with an entry for the corresponding head or tail of the link; the entry specifies the network time reported in the update (block 1224).

c) if the AIR update specifies a link to an IR that is not currently present in its topology table, (block 1230) then:

i) The IR adds the network time when the IR was discovered through the AIR update as a node parameter of the tail of the link reported in the AIR update (block 1232).

ii) The IR updates its new-node table with an entry for the new IR; the entry specifies the network time when the new IR is identified (block 1234).

d) If the AIR update makes the IR to delete an IR from its topology table, the IR also deletes an entry for the same IR from its new-node table, if it exists (block 1240).

IV. Use of Time Slots Allocated for Quasi-Static Scheduling

Time slots are allocated to IRs on a quasi-static basis using complete network membership information. This means that time slots in the neighborhood of any one IR will be wasted if the network connectivity is not very high, i.e., if a given IR has only a few one-hop and two-hop neighbor IRs and there are many IRs in the network.

To improve channel utilization, in an embodiment of the present invention, those time slots allocated for quasi-static scheduling can be used to transmit short control packets that are used primarily to maintain time synchronization in the network, rather than maintaining consisting transmission scheduling. If such short control packets are desirable, the minimum amount of information conveyed in a control packet in an embodiment of the present invention consists of time stamping data and some link management information.

According to one embodiment of the invention, long control packets are exchanged among IRs only over time slots allocated dynamically using the Neighborhood Established Transmission Scheduling (NETS) protocol. Other protocols may be used.

The above specification, examples and data provide a complete description of the manufacture and use of the composition of the invention. Since many embodiments of the invention can be made without departing from the spirit and scope of the invention, the invention resides in the claims hereinafter appended and their equivalents.

What is claimed is:

1. A system for scheduling transmissions without collisions for nodes in an ad hoc network, wherein the nodes include a new node and admitted nodes, comprising:
   the admitted nodes, wherein each of the admitted nodes include:
     a network interface unit arranged to communicate with the nodes within the ad hoc network; and
     a transmission scheduling unit operative to perform actions, including:
       using a quasi-static method for time slot allocation within a frame to enforce an upper bound on a time elapsed between two time slots allocated to the same node;
       determining when the new node has entered the network, and when;
       propagating the information that the new node has entered the network to the other admitted nodes within the network within a finite time; and
       once the new node is admitted to the network and known by a majority of the admitted nodes known neighbors and thereby, the new node becoming one of the admitted nodes, start using the time slots reserved for quasi-static scheduling;
       assigning the time slots for quasi-static scheduling using a network membership date obtained from a routing protocol used in the network;
       a storage unit configured to store information relating to the nodes on the network; and
   the new node, wherein the new node includes:
     a network interface unit arranged to communicate with the nodes within the network; and
     a transmission scheduling unit that is arranged to perform actions, including:
       using a dynamic slot allocation method to transmit packets before the new node is admitted to the network;
       notifying the nodes on the network that the new node has entered the network;
       using a quasi-static method to transmit packets when the new node is admitted to the network; and
       determine when the new node has been admitted to the network; and when, using the quasi-static method after receiving a first update from a neighbor that the neighbor knows the existence of the new node.

2. The system of claim 1, wherein the transmission scheduling unit comprises a frame including separate time slots for dynamic scheduling and time slots for quasi-static scheduling, wherein the separate slots determine an upper bound for time elapsed between the occurrences of time slots.

3. The system of claim 1, wherein propagating the information that the new node has entered the network to the other admitted nodes within the network within the finite time, further comprises each one of the admitted nodes notifying each one of its neighbors that the new node has entered the network.

4. The system of claim 1, wherein using the quasi-static method for time slot allocation within a frame to enforce the upper bound on the time elapsed between the two time slots allocated to the same node, further comprises using a distributed election algorithm to assign the time slots for quasi-static scheduling using a network membership date obtained from a routing protocol used in the network.

5. The system of claim 3, wherein each of the nodes maintains an admitted-node table that specifies all of the nodes in the network that have been admitted for inclusion in the assignment of the time slots reserved for quasi-static scheduling.

6. The system of claim 5, wherein each of the nodes maintains a new-node table that specifies for each one of the nodes in the network a unique identifier and a network time indicating when the new nodes is assumed to have first announced an entry into the network.

7. The system of claim 6, wherein the new nodes delays notifying its entry into the network for a predetermined period of time.

8. The system of claim 7, wherein for quasi-static scheduling the time slots are assigned to the admitted nodes using a deterministic algorithm based on identifiers of all the nodes in the network.

9. The system of claim 8, further comprising, when the new node enters the network, the new node is arranged to notify its neighbors about a network time when it becomes operational.

10. The system of claim 3, wherein the admitted nodes notifies its two closest neighbors.

11. The system of claim 4, further comprising, the admitted nodes including a storage unit that is arranged to maintain an admitted-node table and a new-node table.

12. The system of claim 4, wherein the transmission scheduling unit is further arranged to reconfigure a ratio of the number of the time slots available for quasi-static assignment.

13. The system of claim 11, further comprising moving the new node to the admitted-node table after a predetermined time.

14. The system of claim 11, further comprising synchronizing with the other admitted nodes a time when the new node is added to the admitted-node table.

15. The system of claim 11, wherein the new node uses the quasi-static method after receiving a first update from an admitted node neighbor indicating that it knows about the existence of the new node.

16. The system of claim 11, wherein the new node may start to use a quasi-static scheduling after when all the admitted node neighbors of the new node indicate through update messages that the new node exists.

17. The system of claim 12, further comprising assigning a priority to nodes, wherein the priority is related to how many time slots are allocated to the node.

* * * * *